United States Patent
Murakami et al.

(10) Patent No.: US 6,663,960 B1
(45) Date of Patent: Dec. 16, 2003

(54) FLUORESCENT PARTICLES, METHOD FOR PREPARING THE SAME AND PAPER PREVENTING FORGERY USING THE FLUORESCENT PARTICLE

(75) Inventors: Toru Murakami, Sunto-gun (JP); Yasuhiko Asai, Sunto-gun (JP); Tohru Nakajima, Osaka (JP); Yoshihiro Watanabe, Osaka (JP)

(73) Assignee: Tokushu Paper Mfg. Co., Ltd., Shizuoka (JP)

(*) Notice: Subject to any disclaimer, the term of this patent is extended or adjusted under 35 U.S.C. 154(b) by 0 days.

(21) Appl. No.: 09/622,864

(22) PCT Filed: Dec. 22, 1999

(86) PCT No.: PCT/JP99/07208

§ 371 (c)(1),
(2), (4) Date: Aug. 23, 2000

(87) PCT Pub. No.: WO00/39246

PCT Pub. Date: Jul. 6, 2000

(30) Foreign Application Priority Data

Dec. 25, 1998 (JP) ............................. 10-369959
May 21, 1999 (JP) ............................. 11-142329
Dec. 7, 1999 (JP) ............................. 11-347237

(51) Int. Cl.[7] ................................. B32B 5/16
(52) U.S. Cl. ................. 428/402; 428/403; 428/407; 428/690; 428/537.5; 162/140; 162/162; 427/157
(58) Field of Search ................. 428/402, 403, 428/407, 690, 537.5; 162/140, 162; 427/157

(56) References Cited

U.S. PATENT DOCUMENTS

| 4,396,528 A | 8/1983 | Abbott | 252/301.17 |
| 4,623,602 A * | 11/1986 | Bakker et al. | 430/106 |
| 4,863,783 A * | 9/1989 | Milton | |
| 4,874,188 A | 10/1989 | Gravisse et al. | 283/89 |
| 5,643,674 A * | 7/1997 | Bruno et al. | |
| 6,268,222 B1 * | 7/2001 | Chandler et al. | 436/523 |

FOREIGN PATENT DOCUMENTS

| EP | 0219743 | * | 4/1987 |
| EP | 0 219 743 | | 4/1987 |
| EP | 0 692 517 | | 1/1996 |
| EP | 0 753 623 | | 1/1997 |
| JP | 53-78986 | | 7/1978 |
| JP | 59-25874 | | 2/1984 |
| JP | 2-308892 | | 12/1990 |

(List continued on next page.)

Primary Examiner—Leszek Kiliman
(74) Attorney, Agent, or Firm—Wenderoth, Lind & Ponack, L.L.P.

(57) ABSTRACT

Fluorescent particles strongly fluorescing upon irradiation with ultraviolet rays, as well as a process for producing the same, are provided. A water-insoluble fluorescent dyestuff and/or pigment fluorescing upon irradiation with ultraviolet rays and a powdery material including starch, cellulose, other polysaccharides and sugars are mixed and granulated. The surface of granules of the powdery material may be coated with the fluorescent dyestuff and/or pigment. In granulation or coating, a resin having reactive groups reacting with the hydroxyl groups of the powdery material is used in combination, whereby particles excellent in water resistance can be obtained. Further, the interaction between an anionic binder contained in the granules and a cationic material contained in the coating layer or between a cationic binder contained in the granules and an anionic material contained in the coating layer can be utilized to confer water resistance on the particles. By inclusion of the fluorescent particles in paper, there can be provided anti-falsification paper wherein the particles fluorescing in a specific hue can be clearly visually recognized upon irradiation with ultraviolet rays.

38 Claims, 1 Drawing Sheet

FOREIGN PATENT DOCUMENTS

| | | |
|---|---|---|
| JP | 4-331282 | 11/1992 |
| JP | 5-125358 | 5/1993 |
| JP | 6-6500 | 1/1994 |
| JP | 7-90252 | 4/1995 |
| JP | 10-121039 | 5/1998 |
| JP | 1132385 A * | 4/1999 |
| JP | 11200281 A * | 7/1999 |
| JP | 11-200281 | 7/1999 |
| JP | 11323785 A * | 11/1999 |
| JP | 11-323785 | 11/1999 |

* cited by examiner

FLUORESCENT PARTICLES, METHOD FOR PREPARING THE SAME AND PAPER PREVENTING FORGERY USING THE FLUORESCENT PARTICLE

This is a 371 application of PCT/JP99/07208 filed Dec. 22, 1999.

FIELD OF THE INVENTION

The present invention relates to fluorescent particles, a process for producing the fluorescent particles, and anti-falsification paper using the fluorescent particles.

BACKGROUND ART

Various kinds of anti-falsification paper containing granular, fibrous or chipped materials having the property of emitting a visible light with a specific wavelength upon irradiation with ultraviolet rays (the property of emitting fluorescence) are known. This anti-falsification paper is characterized in that upon irradiation with ultraviolet rays such as black light, a fluorescent material contained in the paper emits a light with a specific wavelength in the visible-light range, and the specific shape of the fluorescent material is detected whereby whether the paper is falsified or not can be judged.

With respect to anti-falsification paper into which a granular fluorescent material was incorporated, the present applicant proposed, in Japanese Utility Model Laid-Open No. 6500/1994 (Japanese Utility Model Application No. 51094/1992), anti-falsification paper into which fluorescent particles produced by coating paper with a material fluorescing upon irradiation with ultraviolet rays and then shredding the coated paper are incorporated.

Further, anti-falsification paper prepared by fixing an ionic fluorescent dyestuff onto special ionic and heat resistant starch particles and incorporating the starch particles into paper was proposed by the present applicant in Japanese Patent Application No. 23904/1998.

In addition, anti-falsification paper prepared by coating the surface of autohesive particles by a high-speed air flow impact method with a water-insoluble pigment fluorescing upon irradiation with ultraviolet rays and then incorporating the particles into paper was proposed by the present applicant in Japanese Patent Application No. 92477/1998.

The above-described prior art techniques are directed to anti-falsification paper prepared by incorporating a granular fluorescent material in paper. In the anti-falsification paper proposed in Japanese Utility Model Laid-Open No. 6500/1994 among the prior art techniques described above, the fluorescent particles seem to be present in the form of amorphous and fine flocks in the paper, but it is difficult to regulate the size of these particles, and there is the problem that unnecessarily large flocks and unnecessarily small flocks are contained in the paper.

Since the anti-falsification paper proposed in Japanese Patent Application No. 23904/1998 makes use of fluorescent particles using a fluorescent dyestuff, there is the problem that the light resistance is inevitably worsened as compared with fluorescent particles using a fluorescent pigment, and the intensity of fluorescing upon irradiation with ultraviolet rays is also low. Further, there is also the problem that the hue of fluorescence is limited.

Although the fluorescent particles used in the anti-falsification paper proposed in Japanese Patent Application No. 92477/1998 have the advantage that they are superior in light resistance and exhibit a higher intensity of fluorescing by use of a fluorescent pigment than that of fluorescent particles using a fluorescent dyestuff, there is the problem that the production thereof necessitates expensive apparatus, and the production yield is low.

On the other hand, inclusion of the fluorescent pigment itself in paper causes many problems. First, there is the problem that since the particle diameter of a commercial fluorescent pigment is as small as about 0.5 to 3 $\mu$m, the presence of individual particles cannot be recognized even if paper containing a few % of fluorescent pigment particles is irradiated with ultraviolet rays in a bright room. To be able to recognize the presence of the fluorescent pigment, the particle size should be increased, but in this case, the pigment with a special particle size should be produced, and thus the price of the usually expensive fluorescent pigment is further raised. In addition, since the specific gravity of the inorganic fluorescent pigment is as high as 4 to 5, there arises the problem that, if paper making is conducted using a pulp slurry containing the pigment with a large particle diameter, the fluorescent pigment is precipitated in the slurry during transfer thereof.

DISCLOSURE OF THE INVENTION

This invention was made under these circumstances, and the object of this invention is to provide completely novel fluorescent particles and a process for producing the same, as well as anti-falsification paper prepared by inclusion of the fluorescent particles in the paper so that the particles fluorescing in various hues with unique cylindrical or spherical shapes can be clearly visually recognized upon irradiation with ultraviolet rays and are further excellent in light resistance.

The fluorescent particles according to the present invention comprise granules of a mixture of a water-insoluble dyestuff and/or pigment fluorescing upon irradiation with ultraviolet rays (also referred to hereinafter as "fluorescent dyestuff" and "fluorescent pigment" or as "fluorescent agent" when the two are generally named) and a powdery material; and the fluorescent particles can be produced by mixing the fluorescent dyestuff and/or the fluorescent pigment with the powdery material and then granulating the mixture.

Further, the fluorescent particles of the present invention comprise granules of a powdery material and a coating layer of a fluorescent dyestuff and/or a fluorescent pigment formed on the surface of the granules; and the fluorescent particles can be produced by granulating the powdery material and then coating the surface of the granules with the fluorescent dyestuff and/or the fluorescent pigment.

Further, the fluorescent particles of the present invention comprise granules of a mixture of a fluorescent dyestuff and/or a fluorescent pigment, a powdery material and a white pigment; and the fluorescent particles can be produced by mixing the fluorescent dyestuff and/or the fluorescent pigment, the powdery material and the white pigment and then granulating this mixture.

Further, the fluorescent particles of the present invention comprise granules of a mixture of a powdery material and a white pigment and a coating layer of a fluorescent dyestuff and/or a fluorescent pigment formed on the surface of the granules; and the fluorescent particles can be produced by granulating a mixture of the powdery material and the white pigment and then coating the surface of the granules with the fluorescent dyestuff and/or the fluorescent pigment.

Further, the fluorescent particles of the present invention comprise granules of a powdery material, a coating layer of a white pigment formed on the surface of the granules and a coating layer of a fluorescent dyestuff and/or a fluorescent pigment formed in the outside of the coating layer of the white pigment; and the fluorescent particles can be produced by granulating the powdery material, then coating the surface of the granules with the white pigment, and coating the outside of the coating layer of the white pigment with the fluorescent dyestuff and/or the fluorescent pigment.

In the present invention, a resin binder having 2 or more reactive groups reacting with the hydroxyl groups of the powdery material may be used in granulation or coating, whereby water-resistant fluorescent particles can be produced.

That is, the water-resistant fluorescent particles of the present invention comprise granules of a mixture of a powdery material having hydroxyl groups, a fluorescent dyestuff and/or a fluorescent pigment, and a resin binder having 2 or more reactive groups (hereinafter referred to simply as resin binder) reacting with the hydroxyl groups of the powdery material; and the fluorescent particles can be produced by mixing the powdery material, the fluorescent dyestuff and/or the fluorescent pigment and the resin binder and then granulating the mixture.

Further, the water-resistant fluorescent particles of the present invention comprise granules of a mixture of a powdery material having hydroxyl groups, a white pigment, a fluorescent dyestuff and/or a fluorescent pigment, and a resin binder; and the fluorescent particles can be produced by mixing the powdery material, the white pigment, the fluorescent dyestuff and/or the fluorescent pigment and the resin binder and then granulating the mixture.

Further, the water-resistant fluorescent particles of the present invention comprise granules of a powdery material having hydroxyl groups and a coating layer of a mixture of a fluorescent dyestuff and/or a fluorescent pigment and a resin binder formed on the surface of the granules; and the fluorescent particles can be produced by granulating the powdery material and then coating the surface of the granules with the fluorescent dyestuff and/or the fluorescent pigment by the resin binder.

Further, the water-resistant fluorescent particles of the present invention comprise granules of a mixture of a powdery material having hydroxyl groups and a white pigment and a coating layer of a mixture of a fluorescent dyestuff and/or a fluorescent pigment and a resin binder formed on the surface of the granules; and the fluorescent particles can be produced by mixing and granulating the powdery material and the white pigment and then coating the surface of the granules with the fluorescent dyestuff and/or the fluorescent pigment by the resin binder.

Further, the water-resistant fluorescent particles of the present invention comprise granules of a powdery material having hydroxyl groups, a coating layer of a white pigment formed on the surface of the granules, and a coating layer of a mixture of a fluorescent dyestuff and/or a fluorescent pigment and a resin binder formed in the outside of the coating layer of the white pigment; and the fluorescent particles can be produced by granulating the powdery material, then coating the surface of the granules with the white pigment, and coating the outside of the coating layer of the white pigment with the fluorescent dyestuff and/or the fluorescent pigment by the resin binder.

Further, in the present invention, the interaction between an anionic or cationic binder contained in the granules and a cationic or anionic material contained in the coating layer in the step of granulation or coating can be utilized to produce water-resistant fluorescent particles.

That is, the water-resistant fluorescent particles of the present invention comprise granules of a mixture of a powdery material and an anionic binder and a coating layer of a mixture of a fluorescent dyestuff and/or a fluorescent pigment and a cationic material formed on the surface of the granules; and the fluorescent particles can be produced by granulating the powdery material by the anionic binder and then coating the surface of the granules with the fluorescent dyestuff and/or the fluorescent pigment by the cationic material.

Further, the fluorescent particles of the present invention comprise granules of a mixture of a powdery material, a white pigment and an anionic binder and a coating layer of a mixture of a fluorescent dyestuff and/or a fluorescent pigment and a cationic material formed on the surface of the granules; and the fluorescent particles can be produced by granulating the powdery material and the white pigment by the anionic binder and then coating the surface of the granules with the fluorescent dyestuff and/or the fluorescent pigment by the cationic material.

Further, the fluorescent particles of the present invention comprise granules of a mixture of a powdery material and a cationic binder and a coating layer of a mixture of a fluorescent dyestuff and/or a fluorescent pigment and an anionic material formed on the surface of the granules; and the fluorescent particles can be produced by granulating the powdery material by the cationic binder and then coating the surface of the granules with the fluorescent dyestuff and/or the fluorescent pigment by the anionic material.

Further, the fluorescent particles of the present invention comprise granules of a mixture of a powdery material, a white pigment and a cationic binder and a coating layer of a mixture of a fluorescent dyestuff and/or a fluorescent pigment and an anionic material formed on the surface of the granules; and the fluorescent particles can be produced by granulating the powdery material and the white pigment by the cationic binder and then coating the surface of the granules with the fluorescent dyestuff and/or the fluorescent pigment by the anionic material.

As described above, the fluorescent particles of this invention can be divided roughly into two types, namely a mixture type prepared by granulating a mixture containing all particle constituent components such as the powdery material and the fluorescent dyestuff and/or the fluorescent pigment, and a core-shell type prepared by coating the outside of granules containing the powdery material with a coating layer containing the fluorescent dyestuff and/or the fluorescent pigment. The particles of the mixture type are advantageous for simple production, but from the viewpoint of fluorescence emission, the fluorescent dyestuff and fluorescent pigment present near the surface of the granules emit fluorescence, but those present in the inside of the particles tend to hardly emit fluorescence. On the other hand, in the particles of the core-shell type, the fluorescent dyestuff and fluorescent pigment are present in only the coating layer outside the core granules, and thus all of them will contribute to fluorescence emission. Accordingly, if the same amount of a fluorescent dyestuff or fluorescent pigment is used, the particles of the core-shell type are advantageous over the particles of the mixture type in the respect that a higher intensity of fluorescence emission can be achieved.

By use of the fluorescent particles of this invention described above, anti-falsification paper which is hardly falsified can be obtained. That is, the anti-falsification paper of this invention is characterized by permitting the above-described fluorescent particles to be contained in paper, or by coating the surface of paper with a coating solution containing the above-described fluorescent particles. In such anti-falsification paper, the fluorescent particles cannot be visually recognized or is hardly visually recognized under normal light (usual light such as natural light, light from an incandescent lamp and light from a fluorescent lamp), but upon irradiation with ultraviolet rays, the particles emit fluorescence, thus making it possible to judge whether the paper is an original or an imitation.

BEST MODE FOR CARRYING OUT THE INVENTION

Figure 1:
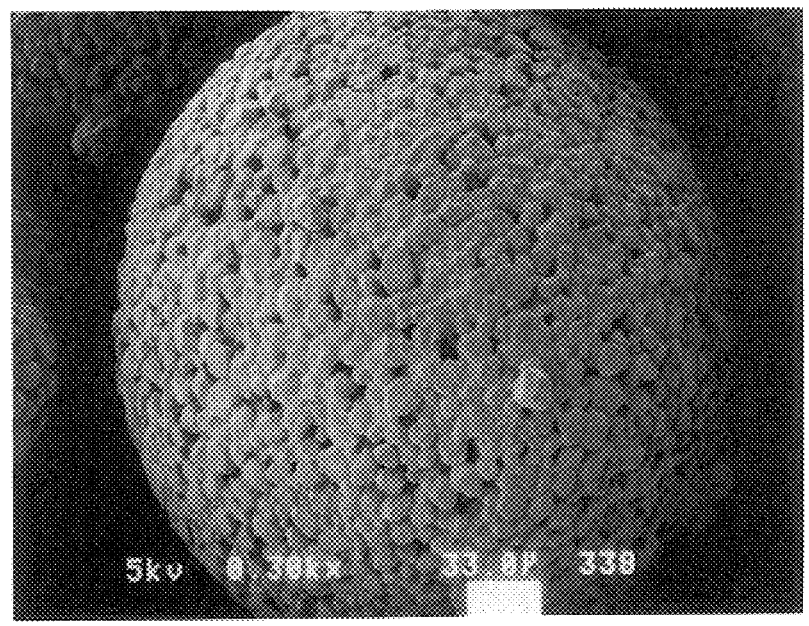
FIG. 1 is an electron micrograph of spherical granular starch before formation of a kaolin coating layer in Example 6 of this invention.

The powdery material used in the present invention is typically starch. Specifically, the starch includes natural starch such as potato starch, corn starch, sweet potato starch, tapioca starch, sago starch, rice starch, amaranth starch, taro starch and Vaccaria pyramidata Medik starch, as well as processed starch thereof (dextrin, acid-decomposed starch, oxidized starch, alpha starch, etherized, esterified or cross-linked starch derivatives, grafted starch and wet-heated starch etc.). As the powdery material, it is also possible to use grain flour such as wheat flour, rice flour and corn flour; water-insoluble powdery cellulose such as powdery cellulose, bacteria cellulose, fine fibrous cellulose and crystalline cellulose; wood meal; cellulose derivatives such as carboxymethyl cellulose, methyl cellulose, ethyl cellulose, hydroxyethyl cellulose, hydroxypropyl cellulose, hydroxyethylmethyl cellulose, hydroxypropylmethyl cellulose and quaternary cationic hydroxyethyl cellulose; polysaccharides and derivatives thereof, such as alginic acid, agar, funori, carrageenan, furcellaran, pectin, chitin, chitosan, guar gum, locust bean gum, tamarind gum, Arabia gum, tragacanth gum, karaya gum, tara gum, arum root pastes, Hibiscus Manihot L., pullulan and dextran; powdery sugars such as glucose, sucrose and lactose; powdery organic materials such as polyvinyl alcohol with high degrees of polymerization and high degrees of saponification.

Further, powdery inorganic materials can also be used as the powdery material. The powdery inorganic materials include those known fillers, such as titanium dioxide, silicates (kaolin, clay, bentonite, talc, synthetic aluminum silicate, synthetic calcium silicate etc.), silicic acid (diatomaceous earth, silica powder, hydrous fine silicic acid powder and anhydrous fine silicic acid powder), calcium carbonate, zinc oxide, magnesium carbonate, calcium.magnesium carbonate, aluminum hydroxide, barium sulfate, calcium sulfate, calcium sulfite, iron oxide etc.

These powdery materials can be used alone or as a mixture thereof. When powdery materials having hydroxyl groups, such as starch, grain flour, cellulose, other polysaccharides, sugar and polyvinyl alcohol, their use in combination with resin binders having reactive groups reacting with the hydroxyl groups is effective for conferring water resistance on the fluorescent particles, and further even if they are coated together with the fluorescent dyestuff and/or pigment, the intensity of fluorescence is not lowered and thus they can also act as extender fillers for the expensive dyestuff and/or pigment. Hence, insofar as the object of the present invention is not inhibited, the resin binder can also be added to the coating solution at the time of coating.

When the fluorescent particles prepared using starch, powdery sugars and polyvinyl alcohol as the powdery material are contained in paper to produce anti-falsification paper, the part where the particles are present tends to be partially transparent. Since such a transparent part can be visually recognized under normal light, the beauty of a printing may be deteriorated if the paper is subjected to printing etc.

To prevent the fluorescent particles from becoming transparent in paper, a white pigment may be used in combination with the powdery material such as starch. By use of the white pigment, the presence of the fluorescent particles in paper is hardly visually recognized under normal light, and the beauty of the printing etc. is not deteriorated, and further it becomes difficult to judge whether means of preventing falsification is taken, and thus the effect of preventing falsification can be further improved.

As the white pigments, those having high degrees of whiteness among the above-described powdery inorganic materials, for example, titanium dioxide, kaolin, clay, talc, calcium carbonate, zinc chloride, zinc sulfide, zinc oxide, magnesium carbonate, calcium.magnesium carbonate, aluminum hydroxide, barium sulfate etc. can be used. In the present invention, these white pigments can be used alone or in combination thereof.

Among these white pigments, those having a large refractive index, that is, those having a refractive index of 2.0 or more can be used to demonstrate a significant effect of preventing the above-described fluorescent particles from becoming transparent in paper. Examples include titanium dioxide (refractive index, about 2.6), zinc sulfide (refractive index, about 2.3), zinc oxide (refractive index, about 2.0), etc.

The fluorescent agents (fluorescent dyestuff and fluorescent pigment) used in the present invention is described herein below. The fluorescent agents used in the present invention should be water-insoluble. This is because if the fluorescent agents are water-soluble, they are eluted from the fluorescent particles added to pulp slurry during production of anti-falsification paper, thus failing to achieve the object of this invention, as described below in detail.

The term "water-insoluble" used in the present invention does not mean the properties of the fluorescent agent itself, but means that the fluorescent agent is not eluted into water after production of particles of the fluorescent agent. That is, fluorescent agents which are water-soluble fluorescent dyestuffs such as spirofuran-based fluorescent dyestuffs but are rendered water-insoluble by reacting with a water resistance-imparting agent used in production of particles of the fluorescent agent, by reacting with a binder, or by being fixed onto the fluorescent particles by virtue of the effect of aluminum sulfate etc. added to pulp slurry during production of anti-falsification paper shall fall under the scope of the water-insoluble fluorescent dyestuffs or fluorescent pigments used in the present invention.

In the present invention, as the water-insoluble dyestuffs fluorescing upon irradiation with ultraviolet rays, that is, the fluorescent dyestuffs, there can be used fluorescent dyestuffs known in the art, such as fluorescein or those based on coumarin, oxazole, pyrazoline, thiadiazole, spiropyran, pyrene sulfonic acid, benzimidazole, diamino stilbene etc.

As the water-insoluble pigments fluorescing upon irradiation with ultraviolet rays, that is, the fluorescent pigments, there can be used organic or inorganic fluorescent pigments. Specifically, the organic pigments include those obtained by uniformly dissolving a dyestuff such as fluorescein, eosin, rhodamine 6G, rhodamine B or basic yellow HG in a resin such as polyvinyl chloride resin, alkyd resin, polymethacrylate ester resin, urea resin or melamine resin and then grinding it.

Specifically, the inorganic fluorescent pigments include zinc sulfide activated with copper, silver, manganese etc.; zinc silicate activated with manganese etc.; zinc sulfide activated with silver, copper etc.; calcium sulfide activated with cadmium, bismuth etc.; strontium sulfide activated with samarium, cerium etc.; calcium tungstate activated with lead etc.; $Sr_5(PO_4)_3Cl$ activated with europium etc.; $Zn_2GeO_2$ activated with manganese etc.; $Y_2O_2S$ activated with europium etc.; and $Y_2O_3$ activated with europium. As necessary, sensitizers such as anthraquinone and acetophenone can be used in combination.

In the present invention, these fluorescent pigments are preferably those having an average particle diameter of 0.5 to 5 μm. If the average particle diameter is less than 0.5 μm, the intensity of fluorescence upon irradiation with ultraviolet rays may be weakened, while if the particle diameter exceeds 5 μm, the fluorescence emission of granules obtained through mixing, granulation and coating becomes easily uneven.

Further, these fluorescent pigments can be used alone or in combination thereof. The hue in fluorescence obtained by simultaneously using 2 or more fluorescent pigments indicates the so-called "additive color mixture". For example, when a pigment emitting red fluorescence and a pigment emitting purple fluorescence are used in combination, there occurs deep blue fluorescence, and similarly, green+red leads to yellow fluorescence, red+purple to crimson fluorescence, and red+green+purple to white fluorescence. This phenomenon is completely different from "subtractive color mixture" which is a phenomenon when paints are mixed. Since the fluorescent pigment unlike the fluorescent dyestuff is rich in the type of hue of fluorescence, there is the feature that a wide variety of fluorescence hues can be obtained by simultaneously using several kinds of fluorescent pigments.

When the fluorescent particles are produced using a water-insoluble and organic solvent-soluble fluorescent dyestuff or fluorescent pigment as the fluorescent agent used in the present invention, the following special effect can be demonstrated. These fluorescent particles are contained in paper followed by printing to produce anti-falsification printed matter, and when the printed indication on this printed matter is attempted to be falsified by using an organic solvent, the organic solvent-soluble fluorescent agent is eluted from the fluorescent particles, and its traces diffused therearound can be visually recognized by irradiation with ultraviolet rays. Accordingly, the presence of falsification can be reliably recognized. As the fluorescent agent insoluble in water but soluble in organic solvent, e.g. amino ketone type dyestuffs can be preferably used.

As described herein below, when anti-falsification paper is produced by permitting the fluorescent particles of this invention to be contained in paper, the fluorescent particles should have water resistance so as not to collapse in water. This is because there are cases in which the fluorescent particles are added to a pulp slurry in the paper making step, in which the fluorescent particles are sprinkled onto a wet paper in the paper making step, or in which the fluorescent particles are added to a coating solution and then applied onto the surface of paper.

To confer water resistance on the fluorescent particles, a resin having 2 or more reactive groups which react with the hydroxyl groups of the powdery material such as starch, grain flour, cellulose, other polysaccharides, sugar or polyvinyl alcohol is used as the binder in the present invention. In the present specification, this kind of resin is referred to as "resin binder". Such resin binders include polyamine.epichlorohydrin-based resin, water-soluble alkylated amino resin, water-soluble methylated melamine-based resin, water-soluble phenol resin, urea resin, epoxylated polyamide resin, methylol polyacrylamide resin etc.

To confer water resistance on the fluorescent particles by using the resin binder, the resin binder may be mixed and granulated with the constituent components of the fluorescent particles, or granules of other components than the fluorescent agent may be coated with the fluorescent agent by using the resin binder.

In an alternative method of conferring water resistance on the fluorescent particles in the present invention, it is possible to adopt a method of utilizing the interaction between an anionic binder contained in the granules and a cationic material contained in the coating layer or between a cationic binder contained in the granules and an anionic material contained in the coating layer. That is, the constituent components excluding the fluorescent agent in the fluorescent particles are granulated with an anionic binder, and the surface of the granules are coated with the fluorescent agent by using a cationic material, whereby the anionic binder can be endowed with water resistance. Alternatively, the constituent components excluding the fluorescent agent in the fluorescent particles are granulated with a cationic binder, and the surface of the granules are coated with the fluorescent agent by using an anionic material, whereby the cationic binder can be endowed with water resistance.

The anionic binder used in the present invention includes polysaccharides having anionic groups or synthetic polymers having anionic groups, such as alginic acid, sodium alginate, carboxymethyl cellulose, carboxymethyl starch, carboxymethyl guar gum, carboxymethyl xanthane gum, carboxymethyl tara gum, low methoxyl pectin, carrageenan, polyacrylic acid and sodium polyacrylate etc.

As the cationic material which is coated along with the fluorescent agent on the surfaces of the granules in order to confer water resistance on this anionic binder, there can be used salts of polyvalent metal ion, such as hydrochlorides, sulfates, carbonates, phosphates, lactates or hydroxides of calcium, magnesium, barium, boron, aluminum or titanium.

Further, cationic water-soluble polymers such as cationic polyacrylamide, polyethylene imine, polyvinyl pyrrolidone, cationic polyamide resin, polyallylamine, cationic polymer grafted starch powder, cationic starch, cationic guar gum, cationic xanthane gum, cationic tara gum etc. can also be used as the cationic material.

As the cationic binder used in the present invention, the cationic water-soluble polymers exemplified above as the cationic material can be used. That is, cationic water-soluble polymers such as cationic polyacrylamide, polyethylene imine, polyvinyl pyrrolidone, cationic polyamide resin, polyallylamine, cationic polymer grafted starch powder, cationic starch, cationic guar gum, cationic xanthane gum, cationic tara gum etc. can be used as the cationic binder.

The polysaccharides having anionic groups or synthetic polymers having anionic groups, which are exemplified above as the anionic binder, can be used as the anionic material which is coated along with the fluorescent agent on the surface of the granules in order to confer water resistance on the cationic binder. That is, alginic acid, sodium alginate, carboxymethyl cellulose, carboxymethyl starch, carboxymethyl guar gum, carboxymethyl xanthane gum, carboxymethyl tara gum, low methoxyl pectin, carrageenan, polyacrylic acid, sodium polyacrylate etc. can be used as the anionic material.

In the present invention, generally and conventionally used methods for granulation of starch etc. can be used for granulation of particle constituent components such as the powdery material, the mixture of the powdery material and the white pigment, the mixture of the powdery material and the fluorescent agent, the mixture of the powdery material, the white pigment and the fluorescent agent. That is, rolling granulation, extrusion granulation, spray-drying granulation, fluidized bed granulation, compression granulation, melt granulation, grinding granulation, stirring granulation etc. can be used. Among these, spray-drying granulation has the feature that small spherical particles can be produced.

In extrusion granulation, there is also the case where granulation is insufficient depending on the type or amount of the binder used. To improve granulation in this case, generally employed binders such as hydroxypropyl cellulose, methyl cellulose, hydroxypropylmethyl cellulose, hydroxyethyl cellulose, oxidized starch, dextrin etc. may be used, as necessary, in combination with the various binders described above, then kneaded and extrusion-granulated. In general, granules obtained by extrusion granulation are used after regulation of the granules in a granule regulator, but if regulation of granules is insufficient due to the type or amount of the binder used, a surfactant or a lubricant can be added as necessary to improve regulation of the granules.

To coat the surface of the granules with the fluorescent agent or white pigment in the present invention, it is possible to use a method wherein the granules are dried and then coated with the fluorescent agent and white pigment along with the binder in the form of liquid (suspension), or the granules are coated with the fluorescent agent and white pigment in the form of powder simultaneously with spraying the binder in a liquid form. As coating devices, not only specialized coating devices but granulators which are employed in the above-described granulation methods and capable of carrying out coating treatment (e.g., a rolling granulator, a fluidized bed granulator or a drying machine capable of spraying a liquid during drying) can also be used. Further, besides the specialized coating devices, any devices which are capable of carrying out coating treatment can be used.

The shape of the fluorescent particles of this invention produced in the method described above is varied depending on the granulation method employed. For example, the particles regulated after extrusion granulation have a cylindrical form in which corners were removed. Their section has a circular form or a nearly circular form, and when their length is identical or almost identical with their diameter, their emission of fluorescence seems to be in a spherical form, while when their length is longer than their diameter, their emission of fluorescence seems to be in an elliptical form. In addition, there is the tendency that the particles obtained by spray-drying granulation are in a nearly spherical form, the particles obtained by rolling granulation or stirring granulation are in a roughly spherical form, and the particles obtained by fluidized bed granulation are in a polygonal form like confetti, but depending on the conditions, the particles may assume a different shape even by the same granulation method.

The particle diameter of the fluorescent particles can be suitably controlled in the range of several $\mu$m to several hundreds pm as necessary, but in the present invention, the particle diameter is controlled preferably in the range of 50 to 800 $\mu$m. If the particle diameter is less than 50 $\mu$m, the emission of fluorescence from the particles contained in paper tends to be visually hardly recognized even under irradiation with ultraviolet rays under normal light. The particles are easily visually recognized as their particle diameter is larger, while the part where the particles are present in paper is protruded thus worsening the feeling when touched by hand and adversely affecting the printing suitability. In consideration of the balance between these two conditions, the particle diameter is controlled preferably in the range described above.

In the present invention, the fluorescent particles may be used without being colored, or may be used after being colored. The fluorescent particles which are not colored have white color or a nearly white hue under normal light, and thus if the particles are contained in paper not colored, it is difficult to recognize the presence of the fluorescent particles in the paper. If the fluorescent particles are colored, it becomes difficult to visually-recognize the presence of the fluorescent particles in the paper by regulating the hue of the fluorescent particles so as to approach the color of the paper. In addition, when the fluorescent particles which are colored are contained in paper not colored, the presence of the fluorescent particles can be visually recognized under normal light.

In the present invention, when the fluorescent particles are colored, the particles are preferably pale-colored such that their hue is not reproducible particularly in a color copying machine. Even if anti-falsification printed matter (e.g. gift certificate) produced by using anti-falsification paper containing the pale-colored fluorescent particles is attempted to be falsified using a color copying machine, the density of the copied part corresponding to the printing part is raised if the copying density has been regulated so as to copy the fluorescent particles, whereby it can be easily judged to be a falsified certificate.

In the present invention, the coloring of the fluorescent particles is preferably dropout color in optical reading. The surface of anti-falsification printed matter such as various gift certificates and tickets is often subjected to printing for OMR or OCR reading. This printing is made for automatic totaling after gift certificates and thickets were used. OMR is an abbreviation of "optical mark recognition", which is a generic term of a system in which the position of a mark provided on paper is recognized by irradiating paper with a light from a light source and receiving a light in a light-receiving element, whereby the position is linked by comparison to number or symbol for totaling and classification, and paper used therein is called OMR paper. OCR is an abbreviation of "optical character recognition" and is a generic term of a system in which letters and numbers printed on paper are optically read, and paper used therein is called OCR paper.

For OMR and OCR reading, predetermined items such as frame, ruled line and description are printed often in dropout color on the surface of the paper. The dropout color is color by which the printed part is recognized by human eyes to be a completely different color from the white background by combination of a light source and a light-receiving element, whereas due to disappearance of this difference in the light-receiving element, the printed part can be perceived to be the same as the white background. In the case of OMR paper or OCR paper, a color light in a suitable wavelength region is set by combination of the type of the light source and the light-receiving element employed, and the dropout color corresponding thereto shall be used. In JIS-C6253 "Print Specifications for Optical Character Recognition", light-receiving devices corresponding to 8 wavelength regions are regulated.

In the present invention, the hue of the fluorescent particles is made dropout color in optical reading, whereby the part where the particles are present in the paper is recognized by human eyes to be a completely different color from the white background, but due to disappearance of this difference in the light-receiving element, it can be perceived to be the same as the white background in OMR or OCR reading.

The fluorescent particles used in the present invention can be constituted such that their hue emitted with irradiation with ultraviolet rays is different from their hue under normal light thereby raising the effect of improving not only fancy but also the ability to prevent falsification. For example, the fluorescent particles seem to be colored red under normal light, and upon irradiation with ultraviolet rays, seem to be colored green or blue to raise fancy.

The fluorescent particles can be colored by a method of using a coloring agent in various steps for production of the fluorescent particles, by a method of staining the fluorescent particles after production with a dyestuff or the like. As the coloring agent, there can be used coloring dyestuffs such as direct dyestuffs, acid dyestuffs and basic dyestuffs, and inorganic and organic coloring pigments. If the fluorescent particles are subjected to light-resistant coloring, an inorganic pigment is preferably used as the coloring agent.

When the water-insoluble and organic solvent-soluble dyestuff is used as the coloring agent in the fluorescent particles, the following unique effect can be demonstrated. That is, these colored particles are contained in paper, and the paper is subjected to printing to produce anti-falsification printed matter, and if the printed indication on this printed matter is attempted to be falsified by using an organic solvent, the dyestuff soluble in the organic solvent is eluted from the fluorescent particles, and its traces diffused therearound can be visually recognized upon irradiation with ultraviolet rays, whereby the presence of falsification can be reliably recognized.

In the fluorescent particles of this invention having the structure wherein the coating layer containing the fluorescent agent is formed on the surface of the granules containing the powdery material, there can be made an embodiment wherein a dyestuff insoluble in water but soluble in organic solvent is contained along with the powdery material in the granules, while a fluorescent pigment having white color or a nearly white hue under normal light is used as the fluorescent agent in the coating layer. In such fluorescent particles, the color of the organic solvent-soluble dyestuff in the granules is concealed by the fluorescent pigment having white color or a nearly white hue in the coating layer so that, when these particles are contained in paper followed by printing to produce anti-falsification printed matter (e.g. passport), the presence of the fluorescent particles is hardly visually recognized under normal light, thus making it difficult to judge whether means of preventing falsification is taken or not, and the effect of preventing falsification can thereby be further improved. Further, when it is attempted to falsify the printed indication on this printed matter by using an organic solvent, the organic solvent-soluble dyestuff is eluted from the core granules in the fluorescent particles, and its traces diffused therearound can be visually recognized and thus the presence of falsification can be reliably recognized.

The dyestuffs insoluble in water but soluble in organic solvent include dyestuffs based on e.g. monoazo, disazo, metal complex salt type monoazo, anthraquinone, phthalocyanine and triallyl methane etc. A "Senryo Binran" (Handbook of Dyestuffs) describes which organic solvents dissolve these dyestuffs, and their type can be identified by color index (C. I. Number).

In the case where the above-described dyestuff insoluble in water but soluble in organic solvent is used, if a dyestuff fluorescing upon irradiation with ultraviolet rays is used as said dyestuff, the dyestuff is eluted upon falsification by using organic solvent, so its traces diffused therearound can be visually recognized under irradiation with ultraviolet rays and thus the presence of falsification can be reliably recognized more easily. Such dyestuffs include aminoketone-based dyestuffs which have a color under normal light and are emit fluorescence in various hues under irradiation with ultraviolet rays.

Production of anti-falsification paper using the fluorescent particles of the present invention is described below. For production of the anti-falsification paper of the present invention, needed-leaved tree bleached kraft pulp (NBKP), broad-leaved tree bleached kraft pulp (LBKP), needle-leaved tree bleached sulfite pulp (NBSP), thermo-mechanical pulp (TMP) etc. are used as major materials. Further, non-wood pulp such as cotton, hemp, bamboo, straw and kenaf and synthetic fibers are used as necessary, and a dry paper strength agent, a wet paper strength agent, a sizing agent, a fixing agent, a retention aid, a drainage aid, a defoaming agent, a dyestuff and a coloring agent are added thereto as necessary to prepare a paper stock. The fluorescent particles are added to the paper stock in a chest etc., and a known paper machine such as Fourdrinier paper machine or cylinder paper machine is used for paper making usually at a freeness of 550 to 250 ml C. S. F. to produce the anti-falsification paper of the present invention.

When the fluorescent particles were contained in paper but exposed to the surface, there may occur the problem that the fluorescent particles may fall out from the paper when the paper is subjected to printing. This phenomenon easily occurs in offset printing due to the large tack of a printing ink. Accordingly, in the case of paper subjected to offset printing, it is preferable that ant-falsification paper is combination paper made of 3 or more paper layers, and the fluorescent particles are contained in the inner layer. Even in the case of such combination paper, ultraviolet rays pass through the front and back outermost layers to arrive at the inner layer, to excite the fluorescent pigment contained therein, thus permitting it to emit fluorescence. However, if the basis weight of the front and back outermost layers is high, ultraviolet rays hardly pass therethrough, and thus the basis weight of the outermost layer is preferably in the range of 15 to 40 g/m$^2$.

For production of anti-falsification paper containing the fluorescence particles, it is possible to adopt not only a method of adding the fluorescent particles previously to the paper stock as described above, but also a method of adding the fluorescent particles to the paper stock passing in a Fourdrinier paper machine or in a cylinder paper machine, a method of introducing the fluorescent particles into a vat in a cylinder paper machine, or a method of sprinkling the fluorescent particles intermittently or in a stripe form via a nozzle onto wet paper on a machine wire. In this case, the paper surface can be coated by a size press etc. with starch, polyvinyl alcohol, various surface sizing agents etc. Further, the paper can be subjected to machine calendering or super calendering as necessary, whereby surface smoothness can be suitably improved.

In addition, the anti-falsification paper of this invention can be produced alos by the so-called coating method. That is, the fluorescent particles are added to conventionally used coating binders such as starch, polyvinyl alcohol, synthetic rubber latex and synthetic resin emulsion etc., to prepare a coating solution containing the fluorescent particles, or a coating solution mainly containing these binders and white pigments for coating such as kaolin and calcium carbonate is prepared. The surface of paper can be coated with this coating solution by a known coater such as air knife coater. Further, the coating solution containing the fluorescent particles can also be coated in a stripe form on the surface of paper by using a stripe coater.

Further, a thin paper such as Japanese paper is coated with the coating solution containing the fluorescent particles and the binder etc., then divided into thin pieces and incorporated into paper whereby anti-falsification paper containing the fluorescent particles can also be produced. In the anti-falsification paper thus produced, only the part where the thin pieces were incorporated has the special effect of emission of fluorescence in a shape of the thin pieces, e.g. in a circular, square, rectangular or asterisk shape.

In addition, the anti-falsification paper of the present invention can be produced also by the so-called printing method. That is, the fluorescent particles are mixed with suitable ink vehicles and printed on the surface of paper by using known printing machines such as screen printing machine and gravure printing machine. Printing in this case may be conducted on the whole surface of paper or with a certain pattern. In the anti-falsification paper thus produced, the printed part only has the special effect of emission of fluorescence depending on the printing pattern.

Furthermore, the anti-falsification paper of this invention can also be produced by the so-called immersion method. That is, the fluorescent particles are added to known binders such as synthetic rubber latex or synthetic resin emulsion, and then may be immersed in paper.

Hereinafter, the present invention is described in more detail with reference to the Examples. In the Examples, weight parts and weight % mean dry weight parts and dry weight %, respectively.

EXAMPLE 1
Production of Fluorescent Particles (Colorless Under Normal Light and Emitting Green Fluorescence Upon Irradiation with Ultraviolet Rays)

100 parts by weight of corn starch, 15 parts by weight of a fluorescent pigment (Mn activated $Zn_2GeO_2$ particles, an average particle diameter of 3.0 $\mu$m), 10 parts by weight of water-soluble methylated melamine-based resin [resin binder] ("Sumitex Resin M-3", Sumitomo Chemical Co., Ltd.), 30 parts by weight of water, and 1 part by weight of polyoxyethylene stearyl ether [lubricant] were mixed and stirred for 10 minutes in a kneader.

This mixture was extruded by an extrusion granulating machine ("Dome Gran", Fuji Powdal Co., Ltd.) into cylindrical granules with a diameter of 500 $\mu$m. The granules were regulated by a granule regulator ["Marumerizer", Fuji Powdal Co., Ltd.] into those in a spherical or elliptical form of a L/D ratio of 3 or less and then dried.

The resulting fluorescent particles were colorless under normal light, but under irradiation with ultraviolet rays (commercial black light (trade name: FL15BLB 15 W) which was also used in the Examples below, Toshiba Corporation), the particles emitted green fluorescence in an elliptical form.

5 parts by weight of the fluorescent particles were dispersed in 100 parts by weight of water and stirred at a velocity of 300 rpm for 10 minutes, but did not collapse.

EXAMPLE 2
Production of Fluorescent Particles (Colorless Under Normal Light and Emitting White Fluorescence Upon Irradiation with Ultraviolet Rays)

100 parts of crystalline cellulose ("Avicel", Asahi Chemical Industry Co., Ltd.), 10 parts by weight of zinc oxide [white pigment], 5 parts by weight of a fluorescent pigment (Mn activated $Zn_2GeO_2$ particles, an average particle diameter of 3.0 $\mu$m), 5 parts by weight of a fluorescent pigment (Eu activated $St_5(PO_4)_3Cl$ particles, an average particle diameter of 4.5 $\mu$m), 5 parts by weight of a fluorescent pigment (Eu activated $Y_2O_2S$ particles, an average particle diameter of 2.2 $\mu$m) and 10 parts by weight of water-soluble methylated melamine-based resin [resin binder] ("Sumitex Resin M-3") were granulated by a granulation.coating device ("High Speed Mixer", Fukae Kogyo Co., Ltd.) with 25 parts by weight of a paste solution of 10 weight % hydroxypropyl starch [general binder] ("Piostarch H", Nichiden Kagaku Co., Ltd.) as the binder, and then dried.

The resulting fluorescent particles with a particle diameter of 300 to 1000 $\mu$m were colorless under normal light, but emitted white fluorescence upon irradiation with ultraviolet rays.

5 parts by weight of the fluorescent particles were dispersed in 100 parts by weight of water and stirred at a velocity of 300 rpm for 10 minutes, but did not collapse.

EXAMPLE 3
Production of Fluorescent Particles (Colorless Under Normal Light and Emitting Blue Fluorescence Upon Irradiation with Ultraviolet Rays)

100 parts by weight of corn flower was spray-dried with 10 parts by weight of polyethylene imine [cationic binder] ("Epomine P-1000", Nippon Shokubai Co., Ltd.) as the binder, to give fine granular starch.

The surface of the fine granular starch was subjected by a fluidized bed granulation coating device ("Flow Coater", Freunt Sangyo Co., Ltd.) to fluidized bed coating with a coating solution containing 20 parts by weight of a fluorescent pigment (Eu activated $St_5(PO_4)_3Cl$ particles, an average particle diameter of 0.8 $\mu$m) and 2 parts by weight of carboxymethyl starch [anionic material] dispersed in 50 Parts by weight of water, to give spherical fluorescent particles with a particle diameter of 200 to 500 $\mu$m.

The fluorescent particles were colorless under normal light and emitted blue fluorescence upon irradiation with ultraviolet rays.

5 parts by weight of the fluorescent particles were dispersed in 100 parts by weight of water and stirred at a velocity of 300 rpm for 10 minutes, but did not collapse.

EXAMPLE 4
Production of Fluorescent Particles (Colorless Under Normal Light and Emitting White Fluorescence Upon Irradiation with Ultraviolet Rays)

100 parts of crystalline cellulose ("Avicel") and 10 parts by weight of zinc oxide [white pigment] were granulated by a granulation.coating device ("High Speed Mixer") with 30 parts by weight of a paste solution of 10 weight % hydroxypropyl starch [general binder] ("Piostarch H") as the binder, and then dried.

The surface of the granules was coated by a granulation-.coating device ("High Speed Mixer") with a coating solution containing 5 parts by weight of a fluorescent pigment (Mn activated $Zn_2GeO_2$ particles, an average particle diameter of 1.0 $\mu$m), 5 parts by weight of a fluorescent pigment (Eu activated $St_5(PO_4)_3Cl$ particles, an average particle diameter of 0.8 $\mu$m), 5 parts by weight of a fluorescent pigment (Eu activated $Y_2O_2S$ particles, an average particle diameter of 2.2 μm) and 10 parts by weight of water-soluble methylated melamine-based resin [resin binder] ("Sumitex Resin M-3") dispersed in 30 parts by weight of water, to give fluorescent particles with a particle diameter of 300 to 1000 μm.

The fluorescent particles were colorless under normal light and emitted white fluorescence upon irradiation with ultraviolet rays.

5 parts by weight of the fluorescent particles were dispersed in 100 parts by weight of water and stirred at a velocity of 300 rpm for 10 minutes, but did not collapse.

EXAMPLE 5
Production of Fluorescent Particles (Colorless Under Normal Light and Emitting Red Fluorescence Upon Irradiation with Ultraviolet Rays)

100 parts by weight of wheat flour and 15 parts by weight of calcium carbonate [white pigment] were subjected by a fluidized bed granulation.coating device ("New Marumerizer", Fuji Powdal Co., Ltd.) to fluidized bed granulation with 30 parts by weight of a paste solution of 10 weight % hydroxypropyl cellulose [general binder] ("HPC-L", Nippon Soda Co., Ltd.).

The surface of the granules was subjected by the fluidized bed granulation.coating device to fluidized bed coating with a coating solution containing 20 parts by weight of a fluorescent pigment (Eu activated $Y_2O_2S$ particles, an average particle diameter of 2.2 μm), 2 parts by weight of polyamine.epichlorohydrin-based resin [resin binder] ("WS564", Nippon PCM Co., Ltd.), 5 parts by weight of dextrin [general binder] and 1 part by weight of a solution of 10% by weight sodium hydroxide dispersed in 50 parts by weight of water, to give spherical fluorescent particles with a particle diameter of 200 to 400 μm.

The fluorescent particles were colorless under normal light and emitted red fluorescence upon irradiation with ultraviolet rays.

5 parts by weight of the fluorescent particles were dispersed in 100 parts by weight of water and stirred at a velocity of 300 rpm for 10 minutes, but did not collapse.

EXAMPLE 6
Production of Fluorescent Particles (Colorless Under Normal Light and Emitting Red Fluorescence Upon Irradiation with Ultraviolet Rays)

The surface of 100 parts by weight of spherical fine granular starch ("Graflow M", Nichiden Kagaku Co., Ltd.) was sprayed by centrifugation fluidization type coating granulator ("Centrifugation fluidization type coating granulator CF", Freunt Sangyo Co., Ltd.) with a coating solution containing 20 parts by weight of kaolin [white pigment] and 1 part by weight of hydroxypropyl cellulose [general binder] dispersed in 40 parts by weight of water, whereby a kaolin coating layer was formed on the surface of the fine granular starch.

Subsequently, this kaolin coating layer was coated thereon by the centrifugation fluidization type coating granulator with a coating solution containing 20 parts by weight of a fluorescent pigment (Eu activated $Y_2O_2S$ particles, an average particle diameter of 2.2 μm), 2 parts by weight of polyamine.epichlorohydrin-based resin [resin binder] ("WS564"), 5 parts by weight of corn starch [powdery material added to the coating solution], and 1 part by weight of a solution of 10 weight % sodium hydroxide dispersed in 50 parts by weight of water, to give fluorescent particles with a particle diameter of 200 to 400 μm.

The fluorescent particles were colorless under normal light and emitted red fluorescence upon irradiation with ultraviolet rays.

5 parts by weight of the fluorescent particles were dispersed in 100 parts by weight of water and stirred at a velocity of 300 rpm for 10 minutes, but did not collapse.

Figure 2:
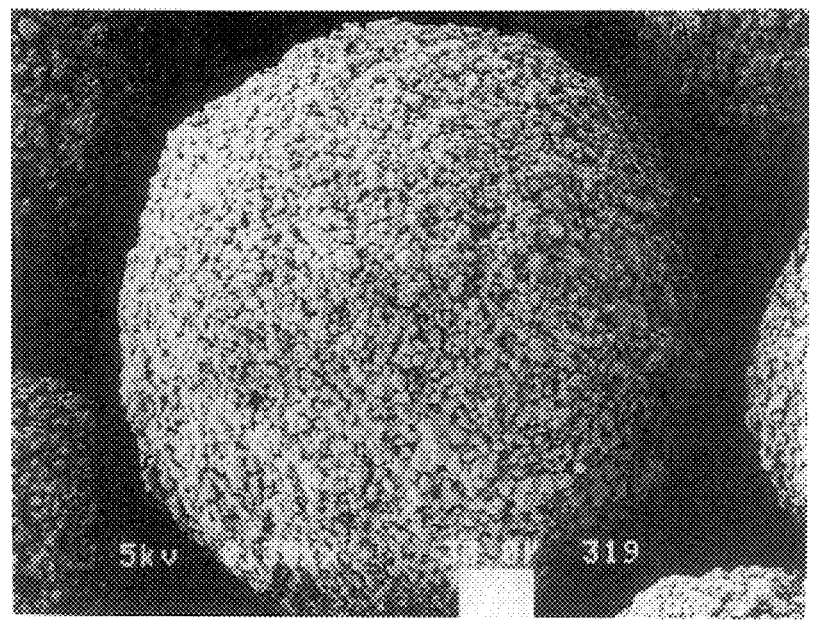
FIG. 2 is an electron micrograph of fluorescent particles obtained in Example 6 of this invention.

An electron micrograph of the spherical fine granular starch before forming a kaolin coating layer is shown in FIG. 1, and an electron micrograph of the fluorescent particles prepared by forming a kaolin coating layer on the surface of the spherical fine granular starch and then forming a coating layer containing the fluorescent pigment thereon is shown in FIG. 2.

EXAMPLE 7
Production of Fluorescent Particles (Colorless Under Normal Light and Emitting Green Fluorescence Upon Irradiation with Ultraviolet Rays)

A paste solution containing 1 part by weight of sodium alginate [anionic binder] and 1 part by weight of hydroxypropyl cellulose [general binder] dissolved in 30 parts by weight of water, and 1 part by weight of polyoxyethylene stearyl ether [lubricant], were added to 100 parts by weight of corn starch and 15 parts by weight of titanium dioxide [white pigment], and the mixture was mixed and stirred for 10 minutes. This mixture was extruded by an extrusion granulating machine ("Dome Gran") into cylindrical granules with a diameter of 500 μm. The granules were formed by a granule regulator ("Marumerizer") into those in a spherical or elliptical form of a L/D ratio of 3 and then dried.

The granules were rolled in the granule regulator and simultaneously spray-coated with a coating solution containing 15 parts by weight of a fluorescent pigment (Mn activated $Zn_2GeO_2$ particles, an average particle size of 3.0 μm) dispersed in 25 parts by weight of a solution of 5 weight % calcium chloride [cationic material], and then dried.

The resulting fluorescent particles in a spherical or elliptical form with a diameter of 500 μm and a length of 500 to 1500 μm were excellent in opaqueness, colorless under normal light and emitted green fluorescence upon irradiation with ultraviolet rays.

5 parts by weight of the fluorescent particles were dispersed in 100 parts by weight of water and stirred at a velocity of 300 rpm for 10 minutes, but did not collapse.

EXAMPLE 8
Production of Fluorescent Particles (Colorless Under Normal Light and Emitting Red Fluorescence Upon Irradiation with Ultraviolet Rays)

50 parts by weight of spherical granules with a particle diameter of 180 to 300 μm ("Nonparel-105", Freunt Sangyo Co., Ltd.) comprising 70% by weight of lactose and 30% by weight of crystalline cellulose granulated by the centrifugation fluidization type coating granulator and 50 parts by weight of spherical granules with a particle diameter of 350 to 500 μm ("Nonparel-101", Freunt Sangyo Co., Ltd.) comprising 65 to 85% by weight of refined white sugar and 15 to 35% by weight of corn starch by the centrifugation fluidization type coating granulator were subjected in a fluidized bed coating drying system equipped with an internal bottle ("Glow Max", Fuji Powdal Co., Ltd.) to fluidized bed coating with a coating solution containing 20 parts by weight of a fluorescent pigment(Eu activated $Y_2O_2S$ particles, an average particle diameter of 2.2 μm), 4 parts by weight of polyamine, epichlorohydrin-based resin [resin binder] ("WS564"), 30 parts by weight of amaranth starch [powdery material added to the coating solution] and 2 parts by weight of a solution of 10 weight % sodium hydroxide dispersed in 50 parts by weight of water and 50 parts by weight of ethanol.

The resulting fluorescent particles were colorless under normal light and emitted red fluorescence in a spherical shape having a diameter of 180 to 550 μm upon irradiation with ultraviolet rays.

5 parts by weight of the fluorescent particles were dispersed in 100 parts by weight of water and stirred at a velocity of 300 rpm for 10 minutes, but did not collapse.

EXAMPLE 9
Production of Fluorescent Particles (Pale Blue Under Normal Light and Emitting Red Fluorescence Upon Irradiation with Ultraviolet Rays)

100 parts by weight of spherical fine granular starch ("Graflow M") were sprayed thereon by a centrifugation fluidization type coating granulator ("Centrifugation fluidization type coating granulator CF") with a coating solution containing 20 parts by weight of kaolin [white pigment] and 1 part by weight of hydroxypropyl cellulose [general binder] dispersed in 40 parts by weight of water, whereby a kaolin coating layer was formed on the surface of the fine granular starch.

Subsequently, this kaolin coating layer was coated thereon by the centrifugation fluidization type coating granulator with a coating solution containing 20 parts by weight of a fluorescent pigment (Eu activated $Y_2O_2S$ particles, an average particle diameter of 2.2 μm), 0.6 part by weight of a blue phthalocyanine pigment (trade name "TB-700 Blue GA", Dainichiseika Colour & Chemicals Mfg. Co., Ltd.), 2 parts by weight of polyamine.epichlorohydrin-based resin [resin binder] ("WS564"), 5 parts by weight of corn starch [powdery material added to the coating solution] and 1 part by weight of a solution of 10 weight % sodium hydroxide dispersed in 50 parts by weight of water, to give spherical fluorescent particles with a particle diameter of 200 to 400 μm.

The fluorescent particles were pale blue under normal light and emitted red fluorescence upon irradiation with ultraviolet rays.

5 parts by weight of the fluorescent particles were dispersed in 100 parts by weight of water and stirred at a velocity of 300 rpm for 10 minutes, but did not collapse.

EXAMPLE 10
Production of Fluorescent Particles (Pale Red Under Normal Light and Emitting Bluish White Fluorescence Upon Irradiation with Ultraviolet Rays)

100 parts by weight of wheat flour and 15 parts by weight of calcium carbonate [white pigment] were subjected by a fluidized bed granulation.coating device ("New Marumerizer") to fluidized bed granulation with 30 parts by weight of a paste solution of 10% by weight of hydroxypropyl cellulose [general binder] ("HPC-L").

The surface of the granules was subjected by the fluidized bed granulation.coating device to fluidized bed coating with a coating solution containing 1.5 parts by weight of a thiophene-based fluorescent dyestuff, 20 parts by weight of polyamine.epichlorohydrin-based resin [resin binder] ("WS564"), 50 parts by weight of dextrin [general binder], 0.5 part by weight of a red inorganic coloring pigment (trade name "TB-200 Red GY", Dainichiseika Colour & Chemicals Mfg. Co., Ltd.) and 10 parts by weight of a solution of 10 weight % sodium hydroxide dispersed in 500 parts by weight of water, to give spherical fluorescent particles with a particle diameter of 200 to 400 μm. The fluorescent particles were pale red under normal light and emitted bluish white fluorescence upon irradiation with ultraviolet rays.

5 parts by weight of the fluorescent particles were dispersed in 100 parts by weight of water and stirred at a velocity of 300 rpm for 10 minutes, but did not collapse.

EXAMPLE 11
Production of Fluorescent Particles (Pale Red Under Normal Light and Emitting Red Fluorescence Upon Irradiation with Ultraviolet Rays)

100 parts by weight of wheat flour and 15 parts by weight of calcium carbonate [white pigment] were subjected by a fluidized bed granulation.coating device ("New Marumerizer") to fluidized bed granulation with 30 parts by weight of a paste solution of 10% by weight of hydroxypropyl cellulose [general binder] ("HPC-L").

The surface of the granules was subjected by the fluidized bed granulation.coating device to fluidized bed coating with a coating solution containing 0.1 part by weight of a fluorescent dyestuff (Rhodamine: trade name "Kayacryl-.Rhodamine BL-ED" which is red under normal light and emitting red fluorescence upon irradiation with ultraviolet rays, Nippon Kayaku Co., Ltd.), 20 parts by weight of polyamine.epichlorohydrin-based resin [resin binder] ("WS564"), 50 parts by weight of dextrin [general binder] and 10 parts by weight of a solution of 10 weight % sodium hydroxide dispersed in 500 parts by weight of water, to give spherical fluorescent particles with a particle diameter of 200 to 400 μm.

The fluorescent particles were pale red under normal light and emitted red fluorescence upon irradiation with ultraviolet rays.

5 parts by weight of the fluorescent particles were dispersed in 100 parts by weight of water and stirred at a velocity of 300 rpm for 10 minutes, but did not collapse.

EXAMPLE 12
Production of Fluorescent Particles (White Under Normal Light, Emitting Blue Fluorescence Upon Irradiation with Ultraviolet Rays and Eluting a Red Dyestuff with an Organic Solvent)

100 parts by weight of wheat flour, 15 parts by weight of calcium carbonate [white pigment] and 2 parts by weight of a water-insoluble and organic solvent-soluble red dyestuff (trade name "Kayaset Red SF-4G", Nippon Kayaku Co., Ltd.) were subjected by a fluidized bed fluidization.coating device ("New Marumerizer") to fluidized bed granulation with 30 parts by weight of a paste solution of 10 weight % hydroxypropyl cellulose [general binder] ("HPC-L").

The surface of the granules was subjected by the fluidized bed granulation.coating device to fluidized bed coating with a coating solution containing 20 parts by weight of polyamine.epichlorohydrin-based resin [resin binder] ("WS564"), 50 parts by weight of dextrin [general binder] and 10 parts by weight of a white inorganic fluorescent pigment (Eu activated $St_5(PO_4)_3Cl$ particles, an average particle diameter of 0.8 μm) dispersed in 500 parts by weight of water, to give fluorescent particles with a particle diameter of 200 to 400 μm.

The fluorescent particles were white under normal light and emitted bluish white fluorescence upon irradiation with ultraviolet rays. Further, upon dropping acetone, the red dyestuff was eluted from the particles.

5 parts by weight of the fluorescent particles were dispersed in 100 parts by weight of water and stirred at a velocity of 300 rpm for 10 minutes, but did not collapse.

EXAMPLE 13
Production of Anti-falsification Paper 20 parts by weight of NBKP and 80 parts by weight of LBKP were beaten in 250 ml C. S. F., and 10 parts by weight of clay, 0.3 part by weight of a paper strength agent (trade name "Polystron 191", Arakawa Kagaku Kogyo Co., Ltd.), 1.0 part by weight of a sizing agent (trade name "Size pine E", Arakawa Kagaku Kogyo Co., Ltd.) and a suitable amount of aluminum sulfate were added thereto to prepare a paper stock.

The fluorescent particles obtained in Example 1 above were added to the paper stock such that the amount of the particles in paper was 0.5% by weight, and anti-falsification paper having a basis weight of 100 g/m$^2$ was produced in a usual manner by using a Fourdrinier paper machine. After the paper was passed through a drying zone in the paper machine and then subjected to machine calendering, the presence of the fluorescent particles could not be perceived even by touching the surface of the paper by hand.

In the resulting anti-falsification paper, the part where the fluorescent particles were contained seemed to be partially transparent under normal light, and upon irradiation with ultraviolet rays, the particles emitting green fluorescence could be visually recognized.

When a solution prepared by dissolving 5.7 parts by weight of potassium iodide and 5 parts by weight of iodine in 1000 ml water and diluting it suitably with water was dropped and spread onto the surface of this anti-falsification paper, the fluorescent particles were dyed violet. The fluorescent particles emitted green fluorescence upon irradiation with ultraviolet rays.

EXAMPLE 14
Production of Anti-falsification Paper 20 parts by weight of NBKP and 80 parts by weight of LBKP were beaten in 350 ml C. S. F., and 10 parts by weight of clay, 0.3 part by weight of a paper strength agent (trade name "Polystron 191"), 1.0 part by weight of a sizing agent (trade name "Size pine E") and a suitable amount of aluminum sulfate were added thereto to prepare a paper stock.

Paper having a basis weight of 110 g/m$^2$ was produced by a Fourdrinier paper machine from the paper stock. During this paper making, the fluorescent particles (sifted to have a particle diameter of 300 to 800 μm by a sifting machine) obtained in Example 2 above were sprinkled onto the whole surface of paper web formed on the machine wire in an amount of 0.5 weight % based on the paper to produce anti-falsification paper. After the paper was passed through a drying zone in the paper machine and then subjected to machine calendering, the presence of the fluorescent particles could not be perceived even by touching the surface of the paper by hand.

In the resulting anti-falsification paper, the fluorescent particles could not be visually recognized under normal light, and the particles emitting white fluorescence could be visually recognized upon irradiation with ultraviolet rays.

EXAMPLE 15
Production of Anti-falsification Paper 20 parts by weight of NBKP and 80 parts by weight of LBKP were beaten in 250 ml C. S. F., and 10 parts by weight of clay, 0.3 part by weight of a paper strength agent (trade name "Polystron 191"), 1.0 part by weight of a sizing agent (trade name "Size pine E") and a suitable amount of aluminum sulfate were added thereto to prepare a paper stock.

The fluorescent particles (sifted to have a particle diameter of 800 to 1000 μm by a sifting machine) obtained in Example 2 above were added to the paper stock such that the amount of the particles in paper was 0.5% by weight, and anti-falsification paper having a basis weight of 100 g/m$^2$ was produced in a usual manner by using a Fourdrinier paper machine. The paper was passed through a drying zone in the paper machine and then subjected to machine calendering.

In the resulting anti-falsification paper, the fluorescent particles could not be visually recognized under normal light, but the part where the particles were present was slightly protruded, and this part was observed to be transparent, and the particles emitting white fluorescence could be clearly visually recognized upon irradiation with ultraviolet rays.

EXAMPLE 16
Production of Anti-falsification Paper 20 parts by weight of NBKP and 80 parts by weight of LBKP were beaten in 350 ml C. S. F., and 10 parts by weight of clay, 0.3 part by weight of a paper strength agent (trade name "Polystron 191"), 1 part by weight of a sizing agent (trade name "Size pine E") and a suitable amount of aluminum sulfate were added thereto to prepare a paper stock.

Combination paper comprising three paper layers and having a basis weight of 110 g/m$^2$ (30 g/m$^2$ front and back outermost layers and 50 g/m$^2$ inner layer) was produced by a cylinder paper machine from the paper stock. During this paper making, the fluorescent particles obtained in Example 3 above were added to the paper stock for only the inner layer in an amount of 1.2% by weight based on the paper to produce anti-falsification paper. After the paper was passed through a drying zone in the paper machine and then subjected to machine calendering, the presence of the fluorescent particles could not be perceived even by touching the surface of the paper by hand.

In the resulting anti-falsification paper, the part where the fluorescent particles were contained seemed to be partially transparent under normal light, and the particles emitting blue fluorescence could be visually recognized upon irradiation with ultraviolet rays.

EXAMPLE 17
Production of Anti-falsification Paper

The fluorescent particles (sifted to have a particle diameter of 300 to 800 μm with a sifting machine) obtained in Example 4 above were mixed in an amount of 0.1 weight % with a coating solution containing 50 parts by weight of kaolin (trade name "UW90", Engelhard Co., Ltd.), 50 parts by weight of calcium carbonate (trade name "Tama Pearl TP222H", Okutama Kogyo Co., Ltd.), 0.25 part by weight of a dispersant (sodium tripolyphosphate), 6 parts by weight of oxidized starch (Nichiden Kagaku Co., Ltd.) and 14 parts by weight of a styrene-butadiene copolymer latex (trade name "Nipol LX407C", Nippon Zeon Co., Ltd.). The thus obtained coating solution was applied in an amount of 15 g/m$^2$ onto the surface of a base paper by a curtain flow coater, followed by super calendering to produce anti-falsification paper. The presence of the fluorescent particles could not be perceived even by touching the surface of the paper by hand.

In the resulting anti-falsification paper, the fluorescent particles could not be visually recognized under normal light, and the particles emitting white fluorescence could be visually recognized upon irradiation with ultraviolet rays.

EXAMPLE 18
Production of Anti-falsification Paper

The fluorescent particles (sifted to have a particle diameter of 800 to 1000 μm with a sifting machine) obtained in Example 4 above were mixed in an amount of 0.1 weight % with a coating solution conataining a styrene-butadiene copolymer latex (trade name "Nipol LX407C"). The thus obtained coating solution was applied in an amount of 15 g/m$^2$ onto the surface of a base paper by a curtain flow coater, followed by super calendering to produce anti-falsification paper.

When the surface of the resulting paper was touched by hand, the part where the fluorescent particles were present was slightly protruded, and this part was observed to be transparent, and the particles emitting white fluorescence could be clearly visually recognized upon irradiation with ultraviolet rays.

EXAMPLE 19
Production of Anti-falsification Paper 20 parts by weight of NBKP and 80 parts by weight of LBKP were beaten in 350 ml C. S. F., and 10 parts by weight of clay, 0.3 part by weight of a paper strength agent (trade name "Polystron 191"), 1.0 part by weight of a sizing agent (trade name "Size pine E") and a suitable amount of aluminum sulfate were added thereto to prepare a paper stock.

Combination paper comprising two paper layers having a basis weight of 110 g/m², each layer having a basis weight of 55 g/m², was produced from the paper stock by using a cylinder paper machine having two vats. During this paper making, the fluorescent particles obtained in Example 9 above were sprinkled in a stripe form between the first and second wet paper layers to produce anti-falsification paper. After the paper was passed through a drying zone in the paper machine and then subjected to machine calendering, the presence of the fluorescent particles could not be perceived even by touching the surface of the paper by hand.

In the resulting anti-falsification paper, a pale blue stripe could be visually recognized under normal light, and the particles emitting red fluorescence in a stripe form could be visually recognized upon irradiation with ultraviolet rays.

EXAMPLE 20
Production of Anti-falsification Paper 20 parts by weight of NBKP and 80 parts by weight of LBKP were beaten in 350 ml C. S. F., and 10 parts by weight of clay, 0.3 part by weight of a paper strength agent (trade name "Polystron 191"), 1.0 part by weight of a sizing agent (trade name "Size pine E") and a suitable amount of aluminum sulfate were added thereto to prepare a paper stock.

Combination paper comprising two paper layers having a basis weight of 110 g/m², each layer having a basis weight of 55 g/m², was produced from the paper stock by using a cylinder paper machine having two vats. During this paper making, the fluorescent particles obtained in Example 10 above were added to the slurry in the first vat such that the amount of the particles in paper was 0.2 weight %, to produce anti-falsification paper. After the paper was passed through a drying zone in the paper machine and then subjected to machine calendering, the presence of the fluorescent particles could not be perceived even by touching the surface of the paper by hand.

In the resulting anti-falsification paper, the pale red particles could be visually recognized under normal light, and the particles emitting bluish white fluorescence could be visually recognized upon irradiation with ultraviolet rays. The resulting anti-falsification paper was subjected to predetermined printing and read by OCR, but since the fluorescent particles added to the paper had dropout color in OCR reading, the fluorescent particles were not read as foreign matter.

EXAMPLE 21
Production of Anti-falsification Paper 20 parts by weight of NBKP and 80 parts by weight of LBKP were beaten in 350 ml C. S. F., and 10 parts by weight of clay, 0.3 part by weight of a paper strength agent (trade name "Polystron 191"), 1.0 part by weight of a sizing agent (trade name "Size pine E") and a suitable amount of aluminum sulfate were added thereto to prepare a paper stock.

Combination paper comprising two paper layers having a basis weight of 110 g/m², each layer having a basis weight of 55 g/m², was produced from the paper stock by using a cylinder paper machine having two vats. During this paper making, the fluorescent particles obtained in Example 11 above were added to the slurry in the first vat such that the amount of the particles in paper was 0.2 weight %, to produce anti-falsification paper. After the paper was passed through a drying zone in the paper machine and then subjected to machine calendering, the presence of the fluorescent particles could not be perceived even by touching the surface of the paper by hand.

In the resulting anti-falsification paper, the pale red particles could be visually recognized under normal light, and the particles emitting red fluorescence could be visually recognized upon irradiation with ultraviolet rays.

EXAMPLE 22
Production of Anti-falsification Paper 20 parts by weight of NBKP and 80 parts by weight of LBKP were beaten in 250 ml C. S. F., and 10 parts by weight of clay, 0.3 part by weight of a paper strength agent (trade name "Polystron 191"), 1.0 part by weight of a sizing agent (trade name "Size pine E") and a suitable amount of aluminum sulfate were added thereto to prepare a paper stock.

The fluorescent particles obtained in Example 12 above were added to this paper stock such that the amount of the particles in paper was 0.5 weight %, to produce anti-falsification paper having a basis weight of 110 g/m² in a usual manner by using a Fourdrinier paper machine. After the paper was passed through a drying zone in the paper machine and then subjected to machine calendering, the presence of the fluorescent particles could not be perceived even by touching the surface of the paper by hand.

In the resulting anti-falsification paper, the fluorescent particles could not be visually recognized under normal light, and the particles emitting blue fluorescence could be visually clearly recognized upon irradiation with ultraviolet rays.

Further, when the surface of the paper was rubbed several times with absorbent cotton impregnated with acetone, a large number of red spots appeared on the surface of the paper. Upon irradiation with ultraviolet rays, a large number of red fluorescence spots could be observed around the particles emitting blue fluorescence.

INDUSTRIAL APPLICABILITY OF THE INVENTION

According to this invention described above, the following effects are provided.

1) The fluorescent particles of the present invention can keep the shape of the particles without being molten at high temperature such as in a drying zone in a paper making machine. Hence, when these particles are incorporated in paper in a paper making process, the particles of specific shape emitting fluorescence in a specific hue can be visually recognized upon irradiation with ultraviolet rays, and can thus be applied preferably to use of anti-falsification paper.

2) When the fluorescent particles using powdery material having hydroxyl groups at the terminals are mixed in paper during paper making, hydrogen bonds between hydroxyl groups of cellulose fibers as the major component in the paper and hydroxyl groups of the powdery material are formed to fix the fluorescent particles in the paper. This leads to the advantage that the fluorescent particles do not fall away in a later printing process.

3) Even if a granular fluorescent pigment itself is attempted to be contained in paper, its specific gravity in the case of an inorganic fluorescent pigment is as high as about 4 to 5, and thus there is a great disadvantage that the pigment easily settles during transfer of slurry containing the pigment. Further, the majority of commercial fluorescent pigments have a diameter as small as 0.5 to 5 μm, and thus there is another disadvantage that their florescence cannot be visually recognized even upon irradiation with ultraviolet rays under normal light. On the other hand, the specific gravity of the fluorescent particles obtained in the present invention is in the range of 1.2 to 1.8, and particles having a particle diameter of 50 μm or more can be easily obtained, and therefore the above disadvantages can be solved.

4) When a fluorescent pigment is used as the fluorescent agent for the fluorescent particles of the present invention, it is possible to achieve considerably higher intensity of fluorescence emission than that of conventional fluorescent particles having starch particles stained with a fluorescent dyestuff.

5) By using both a material having hydroxyl group as the powdery material and a resin having reactive group reacting with the hydroxyl group as the binder, the fluorescent particles excellent in water resistance can be obtained. Further, the interaction between an anionic binder and a cationic material or between a cationic binder and an anionic material can also be utilized to obtain fluorescent particles excellent in water resistance.

6) When the fluorescent particles using, as the powdery material, starch and polyvinyl alcohol colored by an iodine-containing aqueous solution are applied to anti-falsification paper, there is the feature that the starch and polyvinyl alcohol in the paper can be easily detected, whereby the source of the paper can be easily identified.

7) By use of a white pigment as a constituent component of the fluorescent particles, the opaqueness of the particles can be raised. When such fluorescent particles are used in anti-falsification paper, the presence of the fluorescent particles is hardly visually recognized under normal light, thus making it difficult to judge whether means of preventing falsification is taken or not, and the effect of preventing falsification can thereby be further improved.

8) In the present invention, a coloring agent can be used in combination in production of the fluorescent particles, or the fluorescent particles themselves can be colored. When such fluorescent particles are contained in paper, the particles colored in a specific hue can be visually recognized under normal light, while the particles can be colored in a different hue upon irradiation with ultraviolet rays, and therefore, fancy anti-falsification paper can be produced. Further, when the coloring agent is used for dropout color in optical reading, anti-falsification paper suitable for OCR reading or OMR reading can be produced.

9) As the fluorescent agent used in the present invention, a fluorescent dyestuff or a fluorescent pigment which is insoluble in water but soluble in organic solvent can be used to produce the fluorescent particles, and these particles are contained in paper, and the resulting paper is subjected to printing to produce anti-falsification printed matter. If it is attempted to falsify this printed matter by using an organic solvent, the fluorescent agent soluble in the organic solvent is eluted from the fluorescent particles, and its traces diffused therearound can be visually recognized upon irradiation with ultraviolet rays. By utilizing this property, the anti-falsification paper of this invention can be used for anti-falsification printed matter which may be falsified.

10) A coloring agent comprising a dyestuff insoluble in water but soluble in organic solvent can be used for coloring the fluorescent particles, and these particles are contained in paper, and the resulting paper is subjected to printing to produce anti-falsification printed matter. If it is attempted to falsify this printed matter by using an organic solvent, the coloring agent of the dyestuff is eluted from the fluorescent particles, and its traces diffused therearound can be visually recognized. By utilizing this property, the anti-falsification paper of this invention can be used for anti-falsification printed matter which may be falsified.

11) In the fluorescent particles of the present invention structured such that a coating layer containing a fluorescent agent has been formed on the surface of granules containing powdery material, a dyestuff insoluble in water but soluble in organic solvent, along with the powdery material, can be contained in the granules, and a fluorescent pigment with a white color or a hue near to a white color under normal light can be used as the fluorescent agent in the coating layer. In such fluorescent particles, the color of the organic solvent-soluble dyestuff in the granules is shaded by the coating layer, so that when these particles are contained in paper and the resulting paper is subjected to printing to produce anti-falsification printed matter, the presence of the fluorescent particles is hardly visually recognized under normal light, thus making it difficult to judge whether means of preventing falsification is taken or not, and the effect of preventing falsification can thereby be further improved. Further, when it is attempted to falsify this printed matter by using an organic solvent, the organic solvent-soluble dyestuff is eluted from the core granules in the fluorescent particles, and its traces diffused therearound can be visually recognized and thus the presence of falsification can be reliably recognized.

12) Anti-falsification printed matter can be obtained by subjecting the anti-falsification paper of this invention to predetermined printing, and such printed matter can be used effectively in fields requiring anti-falsification, such as gift certificates, stock certificates, bank notes, identification cards, various tickets, passports etc.

13) By utilizing the characteristics described above, the fluorescent particles of this invention can be added at the time of production of nonwoven fabric or twisted yarn to produce characteristically fashionable nonwoven fabric and woven goods.

What is claimed is:

1. A fluorescent particle for anti-falsification applications, comprising a granular core comprising a powder, and a shell layer comprising a water-insoluble fluorescent dyestuff and/or fluorescent pigment which fluoresces upon irradiation with ultraviolet rays and a binder, the shell layer being formed over the granular core using the binder.

2. The fluorescent particle according to claim 1, wherein the granular core further comprises a white pigment.

3. The fluorescent particle according to claim 1, wherein an additional layer of a white pigment is formed between the granular core and the shell layer.

4. The fluorescent particle according to claim 1, wherein the powder has hydroxyl groups, and the binder is a resin binder having 2 or more reactive groups which react with the hydroxyl groups of the powder.

5. The fluorescent particle according to claim 4, wherein the granular core further comprises a white pigment.

6. The fluorescent particle according to claim 4, wherein an additional layer of a white pigment is formed between the granular core and the shell layer.

7. The fluorescent particle according to claim 1, wherein the granular core further comprises an anionic binder, and the shell layer further comprises a cationic material.

8. The fluorescent particle according to claim 7, wherein the granular core further comprises a white pigment.

9. The fluorescent particle according to claim 1, wherein the granular core further comprises a cationic binder, and the shell layer further comprises an anionic material.

10. The fluorescent particle according to claim 9, wherein the granular core further comprises a white pigment.

11. The fluorescent particle according to claim 1, wherein the granular core further comprises a dyestuff insoluble in water but soluble in an organic solvent, and wherein the fluorescent dyestuff and/or fluorescent pigment has a white color or an approximately white hue under normal light.

12. The fluorescent particle according to claims 1, wherein the fluorescent dyestuff and/or fluorescent pigment is soluble in an organic solvent.

13. The fluorescent particle according to claim 1, wherein the fluorescent particle is colored.

14. The fluorescent particle according to claim 13, wherein the fluorescent particle is pale-colored and is not reproducible using a color copying machine.

15. The fluorescent particle according to claim 13, wherein the color is a dropout color in optical reading.

16. The fluorescent particle according to claim 13, which is colored using a dyestuff insoluble in water but soluble in an organic solvent.

17. The fluorescent particle according to claim 1, wherein the particle diameter of the fluorescent particle is 50 to 800 μm.

18. A process for producing a fluorescent particle, which comprises granulating a powdery material, and then coating the resulting granule with a water-insoluble fluorescent dyestuff and/or fluorescent pigment which fluoresces upon irradiation with ultraviolet rays and a binder.

19. The process for producing the fluorescent particle according to claim 18, wherein the powdery material is mixed with a white pigment and then granulated.

20. The process for producing the fluorescent particle according to claim 18, wherein a surface of the granule is coated with a white pigment, and then the white pigment coating layer is coated with the fluorescent dyestuff and/or fluorescent pigment.

21. The process for producing the fluorescent particle according to claim 18, wherein the powdery material has hydroxyl groups, and the fluorescent dyestuff and/or fluorescent pigment is coated thereon together with a resin binder having 2 or more reactive groups which react with the hydroxyl groups of the powdery material.

22. The process for producing the fluorescent particle according to claim 21, wherein the powdery material is mixed with a white pigment and then granulated.

23. The process for producing the fluorescent particle according to claim 21, wherein the granule is coated with a white pigment, and then the white pigment coating layer is coated with the fluorescent dyestuff and/or fluorescent pigment together with the resin binder.

24. The process for producing the fluorescent particle according to claim 18, wherein the powdery material is granulated together with an anionic binder, and the granule is coated with the fluorescent dyestuff and/or fluorescent pigment together with a cationic material.

25. The process for producing the fluorescent particle according to claim 24, wherein the powdery material is granulated together with an anionic binder and a white pigment.

26. The process for producing the fluorescent particle according to claim 18, wherein the powdery material is granulated together with a cationic binder, and the granule is coated with the fluorescent dyestuff and/or fluorescent pigment together with an anionic material.

27. The process for producing the fluorescent particle according to claim 26, wherein the powdery material is granulated together with a cationic binder and a white pigment.

28. Anti-falsification paper comprising a paper comprising a plurality of the fluorescent particles according to any one of claims 1 to 10.

29. The anti-falsification paper according to claim 28, wherein the fluorescent particles are contained in a portion of the paper, and the portion where the particles are present is opaque.

30. The anti-falsification paper according to claim 28, which is formed from a multilayered paper having three or more paper layers, wherein the fluorescent particles are contained in an inner layer.

31. The anti-falsification paper according to claim 30, which has an outermost layer having a basis weight of 15 to 40 g/m$^2$.

32. Anti-falsification paper comprising a paper having a surface coated with a solution comprising a plurality of the fluorescent particles according to any one of claims 1 to 10.

33. The fluorescent particle according to claim 1, wherein the fluorescent dyestuff and/or fluorescent pigment is only present in the shell layer.

34. The process for producing the fluorescent particle according to claim 18, wherein the fluorescent dyestuff and/or fluorescent pigment is only present in the shell layer.

35. The fluorescent particle according to claim 1, wherein the binder is a resin binder.

36. The fluorescent particle according to claim 1, wherein the powder is an organic powder.

37. The process for producing the fluorescent particle according to claim 18, wherein the binder is a resin binder.

38. The process for producing the fluorescent particle according to claim 18, wherein the powdery material is an organic powder.

* * * * *